(12) United States Patent
Elshafie et al.

(10) Patent No.: US 12,015,914 B2
(45) Date of Patent: Jun. 18, 2024

(54) PHYSICAL LAYER SECURITY FOR PHYSICAL UPLINK CONTROL CHANNEL TRANSMISSIONS

(71) Applicant: QUALCOMM Incorporated, San Diego, CA (US)

(72) Inventors: Ahmed Elshafie, San Diego, CA (US); Hung Dinh Ly, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/513,366

(22) Filed: Oct. 28, 2021

(65) Prior Publication Data
US 2023/0140539 A1    May 4, 2023

(51) Int. Cl.
| | | |
|---|---|---|
| H04W 12/06 | (2021.01) | |
| H04L 5/00 | (2006.01) | |
| H04W 12/0431 | (2021.01) | |
| H04W 12/08 | (2021.01) | |
| H04W 12/12 | (2021.01) | |
| H04W 12/79 | (2021.01) | |
| H04W 72/0453 | (2023.01) | |
| H04W 72/21 | (2023.01) | |
| H04W 88/02 | (2009.01) | |

(52) U.S. Cl.
CPC ....... *H04W 12/0431* (2021.01); *H04L 5/0012* (2013.01); *H04L 5/0051* (2013.01); *H04W 12/79* (2021.01); *H04W 72/0453* (2013.01); *H04W 72/21* (2023.01)

(58) Field of Classification Search
CPC . H04W 12/0431; H04W 12/79; H04W 72/21; H04W 72/0453; H04L 5/0012; H04L 5/0051
See application file for complete search history.

(56) References Cited

U.S. PATENT DOCUMENTS

| | | | |
|---|---|---|---|
| 2013/0114813 A1* | 5/2013 | Chai | H04L 9/0827 455/411 |
| 2015/0092750 A1* | 4/2015 | Huang | H04W 12/043 370/331 |
| 2019/0261356 A1* | 8/2019 | Myung | H04W 72/02 |
| 2020/0351061 A1* | 11/2020 | Yang | H04L 27/2636 |

* cited by examiner

*Primary Examiner* — Moustapha Diaby
(74) *Attorney, Agent, or Firm* — Patterson & Sheridan LLP

(57) ABSTRACT

Certain aspects of the present disclosure provide techniques for securing physical (PHY) layers in wireless communication. Certain aspects are directed to a method for wireless communication by a user equipment (UE). In some examples, the method includes obtaining a key and using the key during physical layer signal processing of a physical uplink control channel (PUCCH) transmission having more than one symbol to provide security for the PUCCH transmission.

28 Claims, 13 Drawing Sheets

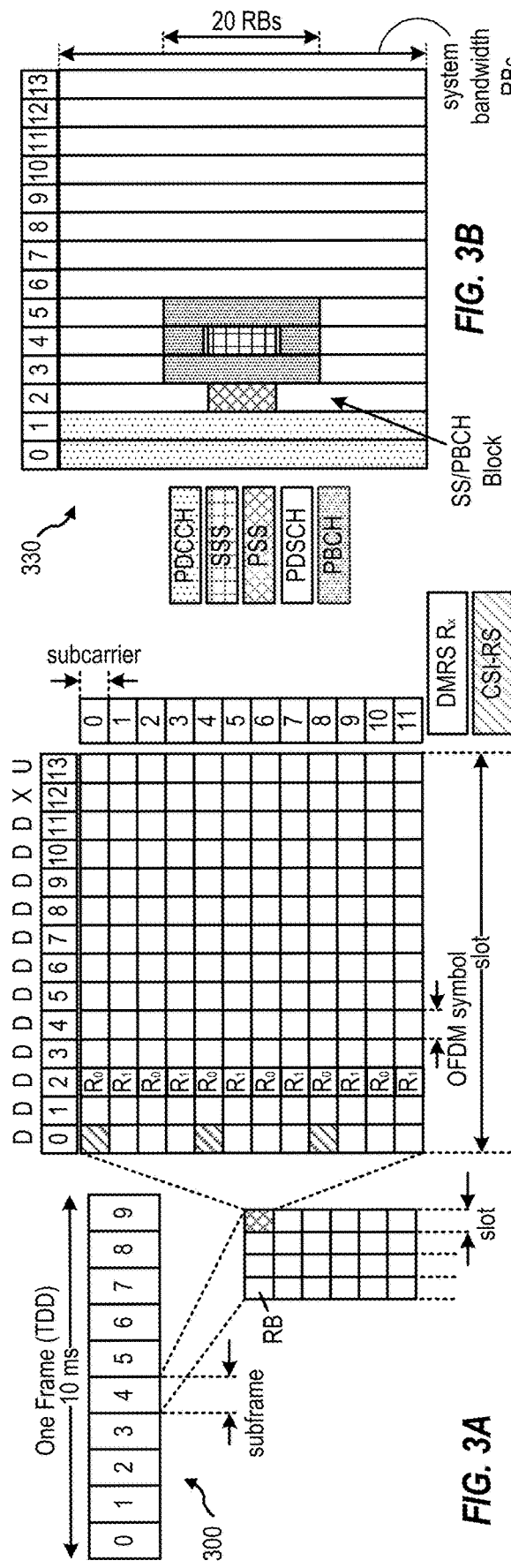
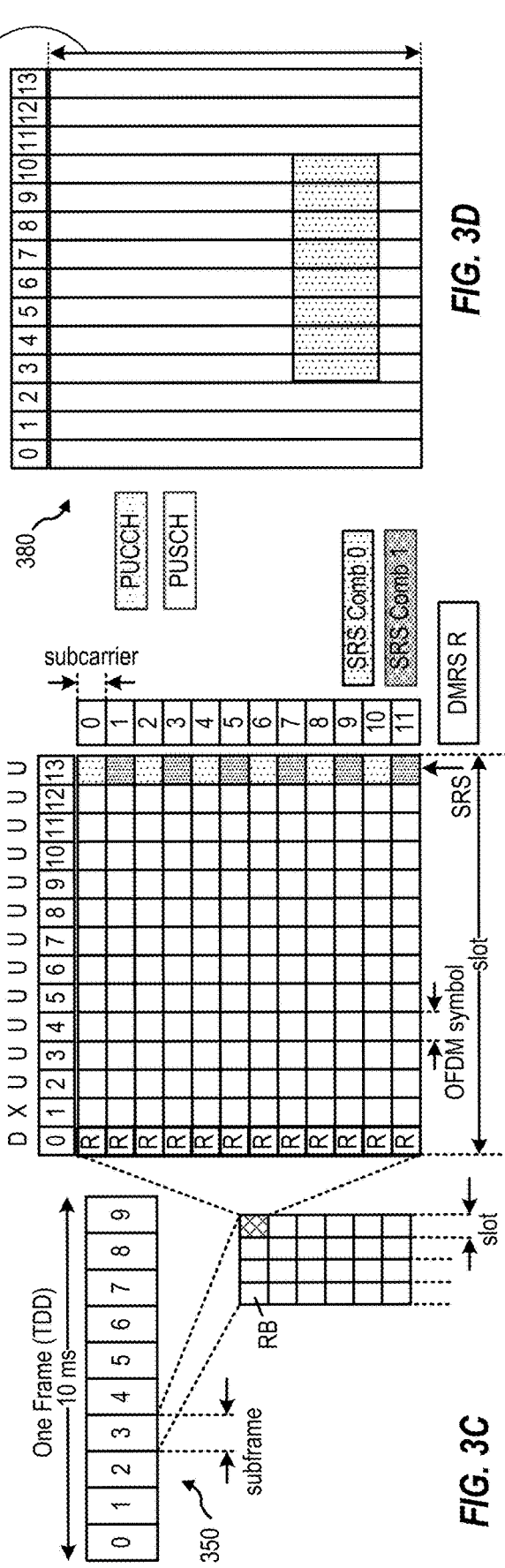

| | IDLE/INACTIVE | TRANSITION | CONNECTED |
|---|---|---|---|
| L3 RRC | System Information, Paging | CCCH | DCCH |
| L3 UP data | N/A | N/A | DTCH |
| L2 control | N/A | MAC CE | MAC CE, Control PDU |
| L2 header | N/A | MAC | PDCP/RLC/MAC |
| L1 PHY | DCI for Paging | DCI for the initial access | DCI/PUCCH |

*Fake Base Station attack could lead to out-of-service*

*Fake Base Station attack could lead to throughput degradation*

*FIG. 6*

PHYSICAL LAYER SECURITY FOR PHYSICAL UPLINK CONTROL CHANNEL TRANSMISSIONS

INTRODUCTION

Aspects of the present disclosure relate to wireless communications, and more particularly, to techniques for securing physical (PHY) layer communications.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a base station (BS). In some examples, the method includes generating a secured first index based at least in part on a first index and a first secret key, the first index corresponding to a first orthogonal cover code (OCC) for communication over at least a first channel between the BS and a user equipment (UE). In some examples, the method includes transmitting, to the UE, the secured first index and the first secret key.

One aspect provides a method for wireless communication by a user equipment (UE). In some examples, the method includes receiving an indication of one or more orthogonal cover code (OCC) matrices including a first OCC matrix, wherein the first OCC matrix comprises a plurality of OCCs. In some examples, the method includes receiving, from a base station (BS): a secured first index based at least in part on a first index and a first secret key, the first index corresponding to a first OCC of the plurality of OCCs for communication over at least a first channel between the BS and the UE; and the first secret key.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 6 is a table illustrating how unprotected communications could impact performance.

DETAILED DESCRIPTION

Aspects of the present disclosure provide apparatuses, methods, processing systems, and computer-readable mediums for securing physical (PHY) layer communications.

Secure communications are very important in many wireless communications systems. For example, in wireless communications systems involving Internet of Things (IoT)

devices (e.g., in a factory automation scenario), security may be crucial since many devices will be connected to each other. Given the level of importance of data obtained from IoT devices, adding more security using secret keys (e.g., with addition secure bits obtained from channels and sounding signals between legitimate nodes) may be beneficial. Unfortunately, such keys could be manipulated using several various mechanisms, including block cipher techniques, hashing and counter usage (e.g., based on symbol, subslot, slot information). Attacks based on such mechanisms may have severe impact on system performance, for example, leading to throughput degradation or even out-of-service (OOS) events.

Aspects of the present disclosure, however, provide PHY layer security (PLS) schemes that may help prevent such attacks, making it difficult for eavesdropping devices to decode uplink transmissions that are not intended for them. By utilizing keys to secure physical uplink control channel (PUCCH) transmissions, eavesdropping attacks may be prevented, which may help avoid the negative impact on system performance often associated with such attacks.

Introduction to Wireless Communication Networks

Figure 1:
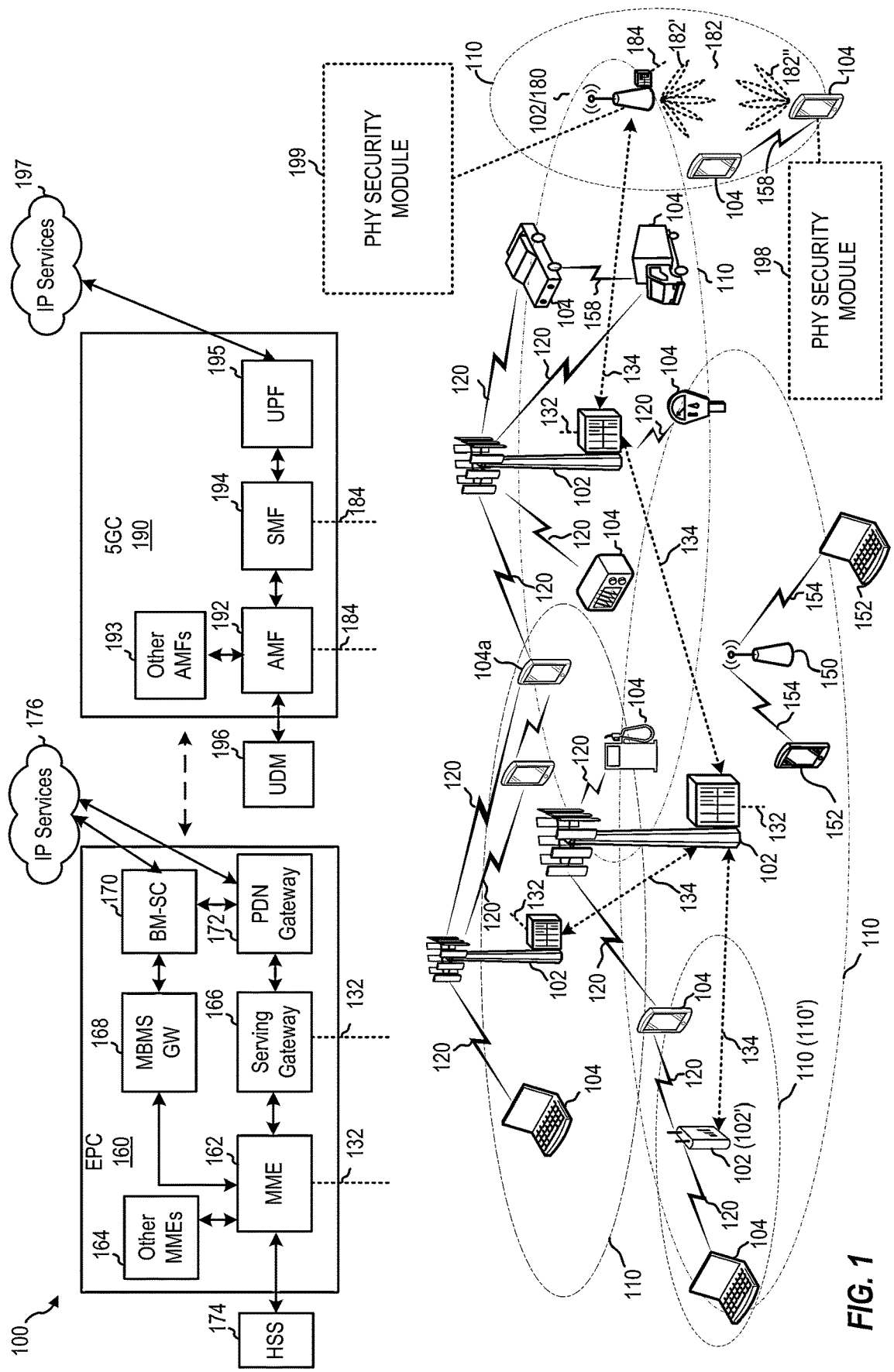
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipment (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as MU-MIMO. This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, transmit and receive directions for base station 180 may or may not be the same. Similarly, transmit and receive directions for UE 104 may or may not be the same.

Wireless communication system 100 includes a PHY security module 199, which may be configured to secure PHY layer communications. Wireless network 100 further includes a PHY security module 198, which may be used configured to secure PHY layer communications.

Figure 2:
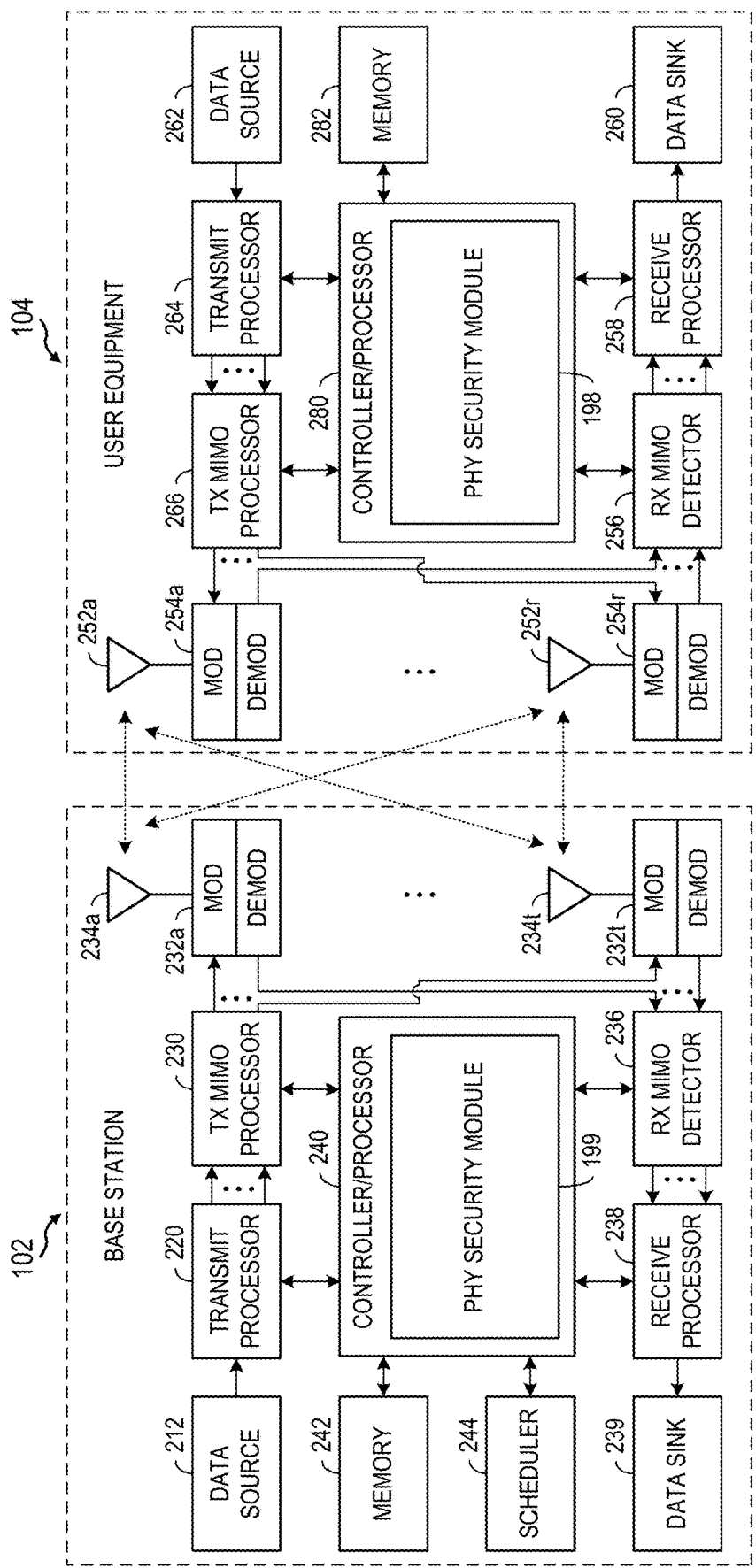
FIG. 2 is a block diagram conceptually illustrating aspects of an example of a base station (BS) and user equipment (UE).

FIG. 2 is a block diagram illustrating aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and UE 104.

Base station 102 includes controller/processor 240, which may be configured to implement various functions related to wireless communications. In the depicted example, controller/processor 240 includes the PHY security module 199. Notably, while depicted as an aspect of controller/processor 240, PHY security module 199 may be implemented additionally or alternatively in various other aspects of base station 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes the PHY security module 198. Notably, while depicted as an aspect of controller/processor 280, the PHY security module 198 may be implemented additionally or alternatively in various other aspects of UE 104 in other implementations.

FIGS. 3A-3D depict aspects of data structures for a wireless communication network, such as wireless communication system 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Overview of PUCCH Transmissions

Physical uplink control channel (PUCCH) transmissions may be sent in various manners, for example. For example, PUCCH transmissions may be sent as coherent transmissions based on demodulation reference signals (DMRS). In this context, a coherent transmission generally refers to the ability of a receiver to track the phase of the transmission and extract any phase and frequency information carried by a transmitted signal.

Figure 4A:
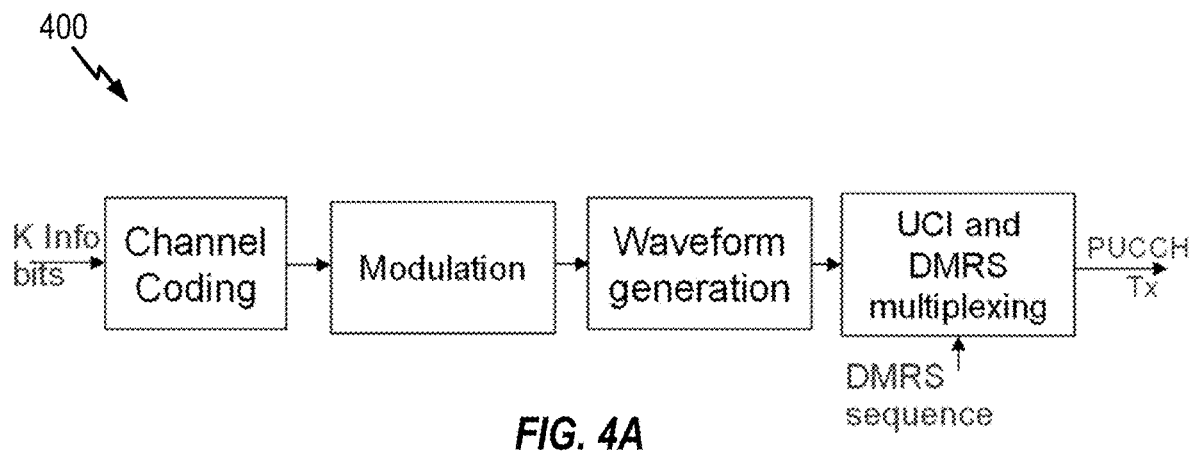
FIG. 4A is a block diagram illustrating demodulation reference signal (DMRS) based coherent communications, to which aspects of the present disclosure may be applied.

Examples of DMRS-based PUCCH transmissions include various formats (e.g., PUCCH formats 1/2/3/4) in NR Release 15. FIG. 4A is a block diagram of various processing components for DMRS-based PUCCH transmissions. As illustrated, K information bits (e.g., uplink control information-UCI) may be encoded, with channel coding to generate a set of coded bits. The coded bits may be modulated and, after modulation, a waveform may be generated. As illustrated, DMRS sequences may be multiplexed with the UCI in the PUCCH transmission, in order to allow for channel estimation at the receiver as part of coherent demodulation.

Figure 4B:
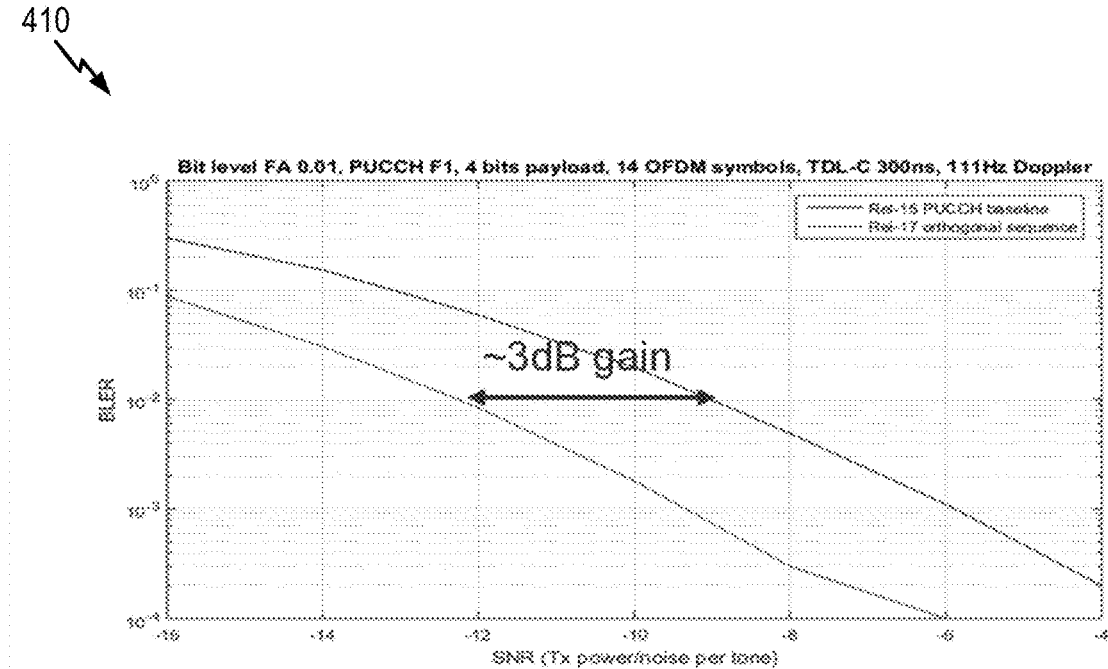
FIG. 4B illustrates how DMRS based coherent communications may suffer at low signal to noise ratio (SNR).

As illustrated in FIG. 4B, DMRS-based coherent communication may suffer from significant performance loss at low signal to noise ratio (SNR) conditions. In such cases, the additional overhead of DMRS may not be warranted and the low SNR may lead to bad channel quality estimation. Thus, existing channel coding (e.g., Reed-Muller RM code for <=11 bits) may not be optimized at low rates.

FIG. 4B shows how DMRS-less non-coherent transmissions may suffer less significant performance loss, when compared to DMRS-based coherent transmissions. Non-coherent DMRS-less PUCCH transmissions may be supported, for example, in NR Release 17, particularly for UCI payload of more than one bit.

Figure 5A:
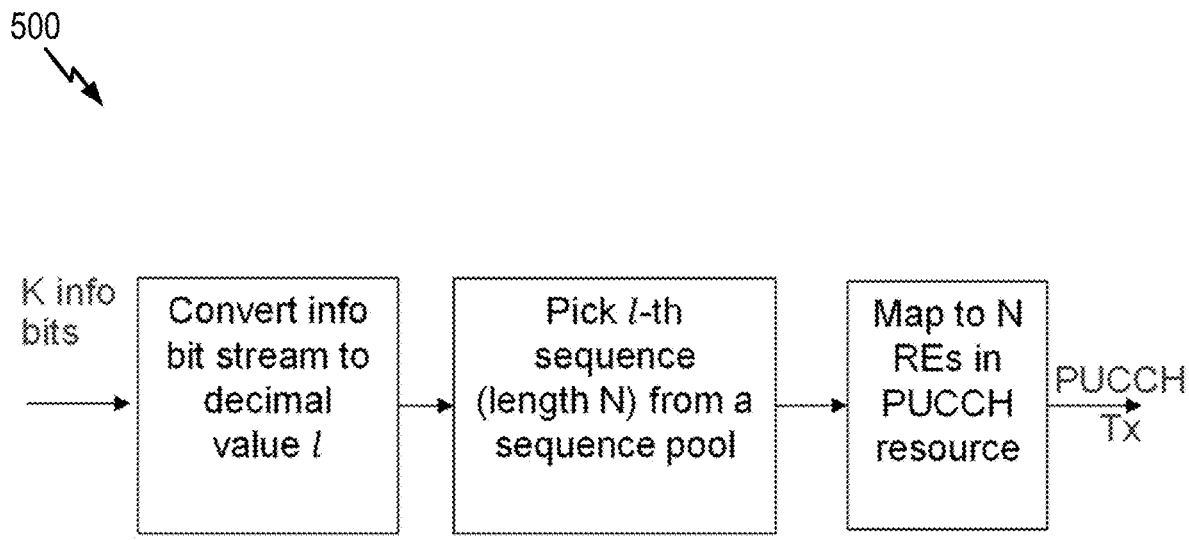
FIG. 5A is a block diagram illustrating DMRS-less non-coherent communications, to which aspects of the present disclosure may be applied.

FIG. 5A is a block diagram of various processing components for DMRS-less PUCCH transmissions. As illustrated, the stream of K information bits may be converted to a decimal value l. The decimal value l may be used to select a sequence (of length N) from a pool of such sequences. The length N sequence may be mapped to N REs in a PUCCH resource.

Figure 5B:
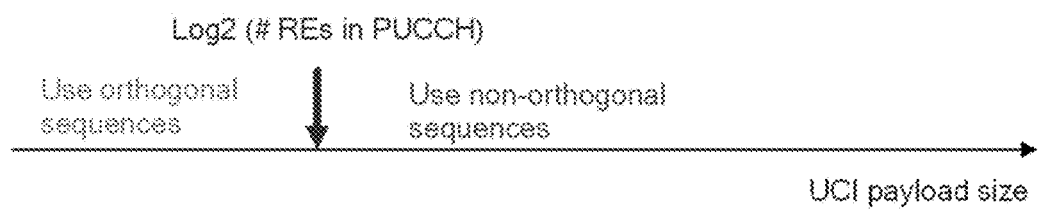
FIG. 5B illustrates how a decision to use orthogonal sequences or non-orthogonal sequences may be based on uplink control information (UCI) payload size.

As illustrated in FIG. 5B, whether to use orthogonal sequences or non-orthogonal sequences may be based on UCI payload size. For example, for smaller UCI payload sizes (e.g., and fewer number of REs in PUCCH), orthogonal sequences may be used, while non-orthogonal sequences may be used for larger UCI payload sizes.

Aspects Related to Physical (PHY) Layer Security

Aspects of the present disclosure provide apparatuses, methods, processing systems, and computer-readable mediums for applying physical (PHY) layer security (PLS) schemes to PUCCH transmissions. The PHY layer security schemes may prevent devices, that are not the intended recipient, from decoding the PUCCH transmissions.

As noted above, secure communications are very important in many wireless communications systems, such as those involving IoT devices. In such cases, adding more security using secret keys may be beneficial. The secret keys may be obtained from a variety of sources. For example, secret keys could be obtained from upper layer techniques, for example, using a Diffie-Hellman (DH) algorithm that is a form of a key-exchange protocol which relies on using a Rivest—Shamir—Adleman (RSA) algorithm or other mechanisms to share keys that rely on Elliptic Curve Cryptography (ECC), or PHY layer using channel reciprocity and randomness.

Unfortunately, such keys could be manipulated using several various mechanisms, including block cipher techniques, hashing and counter usage. One possible attack using CSI could be that an active attacker could establish a smart attack on a direction of a UE, using signaled PMI from the UE. As illustrated in FIG. 6, such attacks based on PUCCH information may have severe impact on system performance, for example, leading to throughput degradation or OOS events.

Aspects of the present disclosure provide secure mechanisms, from the PHY-layer point of view, which may help secure PUCCH transmissions. This approach may help ensure that an eavesdropper does not know the decoding status and, thus, is not able to combine the signals and also does not know the information of the UE, including SR, CSI, and the like.

Aspects of the present disclosure, however, provide PHY layer security (PLS) schemes that may help prevent such attacks, making it difficult for eavesdropping devices to decode uplink transmissions that are not intended for them. By utilizing keys to secure PUCCH transmissions, eavesdropping attacks may be prevented, which may help avoid the negative impact on system performance often associated with such attacks. The techniques may be applied to secure DMRS-based PUCCH formats (PFs) 1/2/3/4 per NR Release 15 coherent designs, as well as DMRS-less noncoherent PUCCH transmissions (e.g., per NR Release 17 and beyond).

Figure 7:
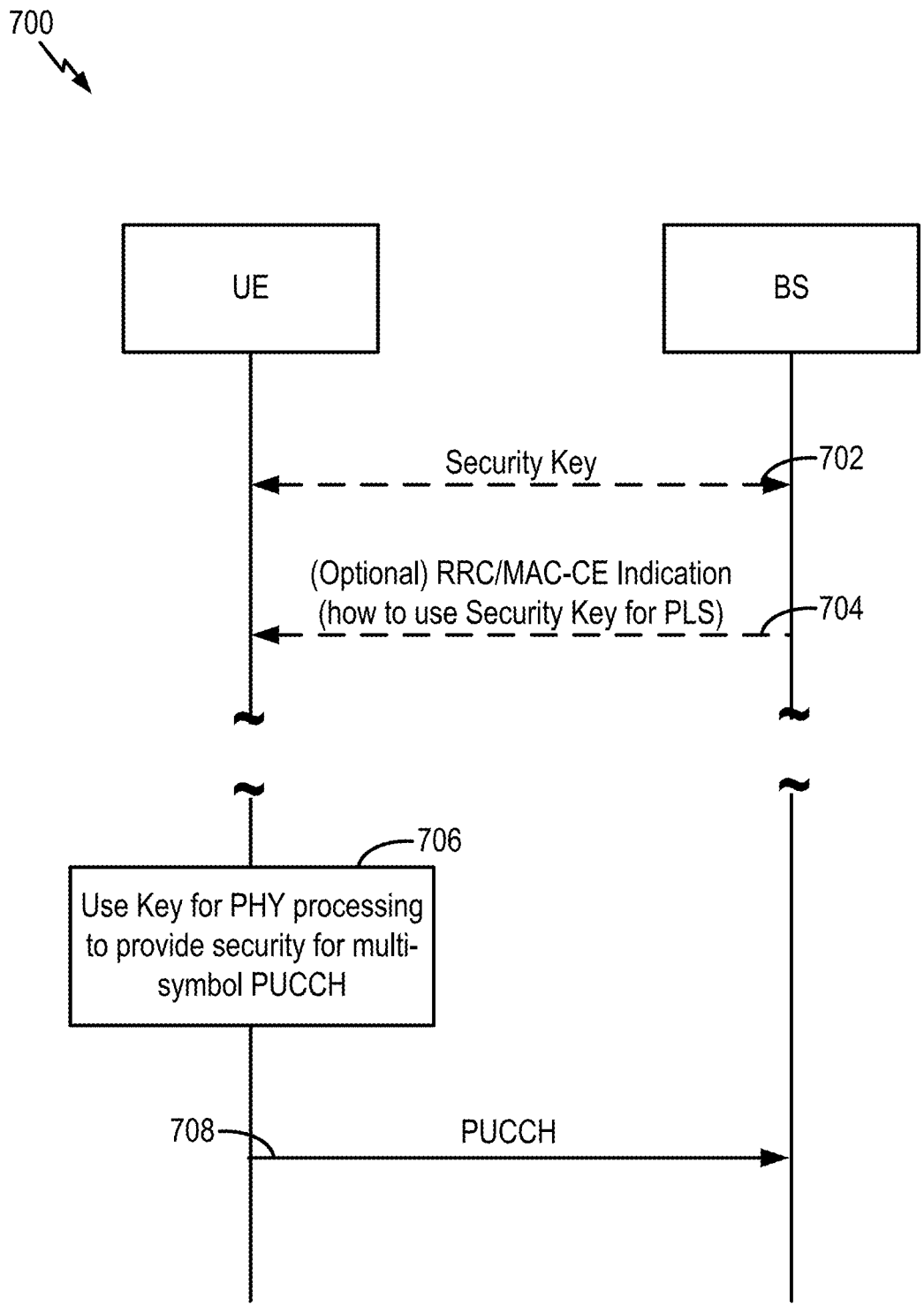
FIG. 7 is a call-flow diagram illustrating example communications between a BS and a UE, according to aspects of the present disclosure.

FIG. 7 is a call-flow diagram 700 illustrating example of how PLS may be applied to secure a PUCCH transmission from a UE to a BS (e.g., a gNB), in accordance with aspects of the present disclosure.

At 702, the UE obtains a secure a security key. As noted above, the security key may be obtained via any suitable algorithm or protocol. At 706, the UE uses the key for PHY layer processing to provide security for a (e.g., a multi-symbol) PUCCH transmissions (sent at 708).

As will be described in greater detail below, there are various options for how the UE may apply the key in order to secure a PUCCH transmission. In some cases, as an option, the BS may indicate how the UE is to apply the key. For example, as illustrated at 704, the BS may provide the indication via radio resource control (RRC) or medium access control (MAC) control element (CE) signaling.

In some cases, how the UE applies the key to secure the PUCCH transmission may depend on whether the PUCCH transmission is sent as a coherent DMRS-based PUCCH transmission or a DMRS-less PUCCH transmission.

Figure 8A:
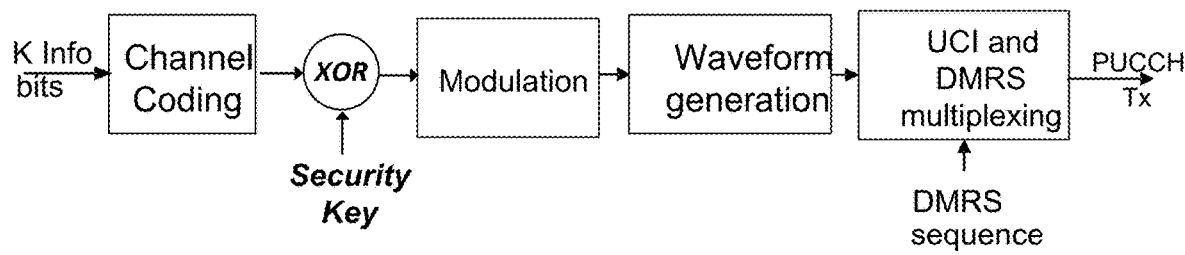
FIG. 8A, FIG. 8B, and FIG. 8C illustrate various examples of physical (PHY) layer security for DMRS based physical uplink control channel (PUCCH) transmissions, according to aspects of the present disclosure.

As illustrated in FIG. 8A, for a DMRS-based PUCCH transmission, the UE may perform an XOR of the key with the encoded bits before modulation. In some cases, as an alternative or in addition, the UE may swap the real and imaginary parts after modulation.

Figure 8B:
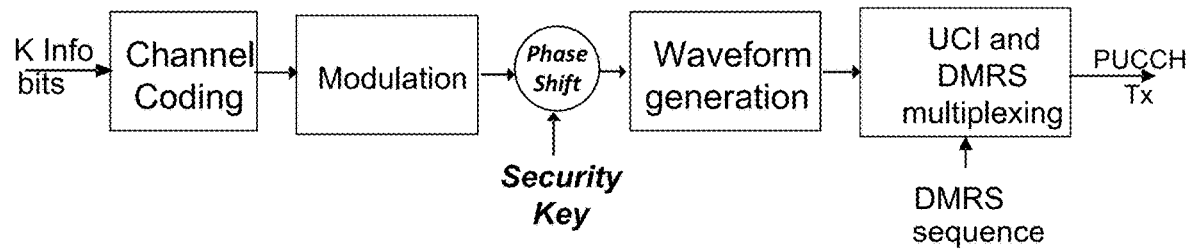
Figure 8C:
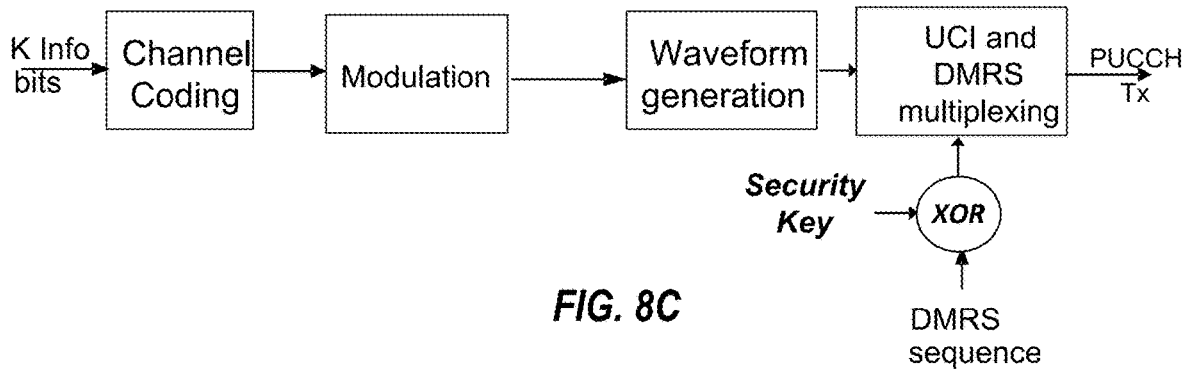

As illustrated in FIG. 8B, in some cases, the UE may shift the phase of the modulated signal using a phase shift based on the key. As an alternative, or in addition, the UE may perform, the UE may perform an XOR of the secret key with the DMRS sequence (effectively securing the DMRS), as illustrated in FIG. 8C. In addition, or as an alternative, the DMRS configuration could be randomized using the key. In some cases, the gNB could indicate a configuration x such that this configuration x is modified (and becomes configuration y) based on the secret key, where configuration y is a desired configuration.

In some cases, the UE may XOR the secret key with a cell-specific sequence S (e.g., of length-12). In some cases, multiple of the mechanisms described above may be combined to secure a DMRS-based PUCCH transmission. As noted above, exactly how the UE is to secure the PUCCH transmission may be at least partially indicated by the gNB (e.g., via RRC/MAC-CE signaling).

Figure 9A:
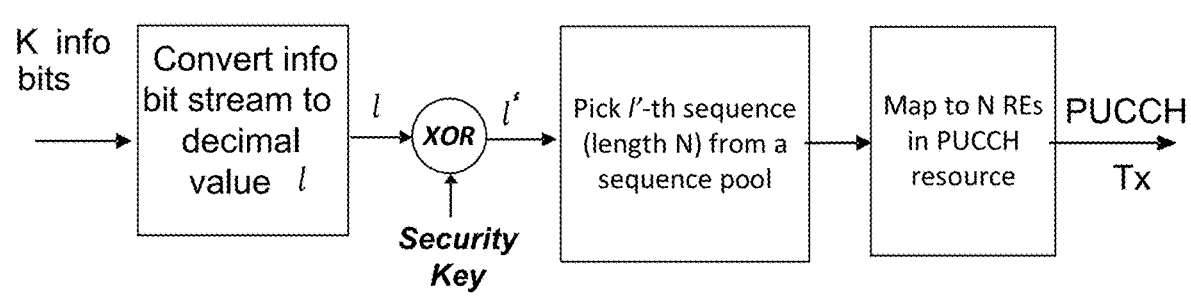
FIG. 9A and FIG. 9B illustrate various examples of physical (PHY) layer security for DMRS-less physical uplink control channel (PUCCH) transmissions, according to aspects of the present disclosure.

As illustrated in FIG. 9A, for a DMRS-less PUCCH transmission, the UE may perform an XOR of the key with the value $\ell$ (in binary domain). In some design, $\ell$ may be two parts (e.g., a digital Fourier transform/DFT index and another index). In such cases, each part could be XORed with a separate key (for stronger security) or the same key.

Figure 9B:
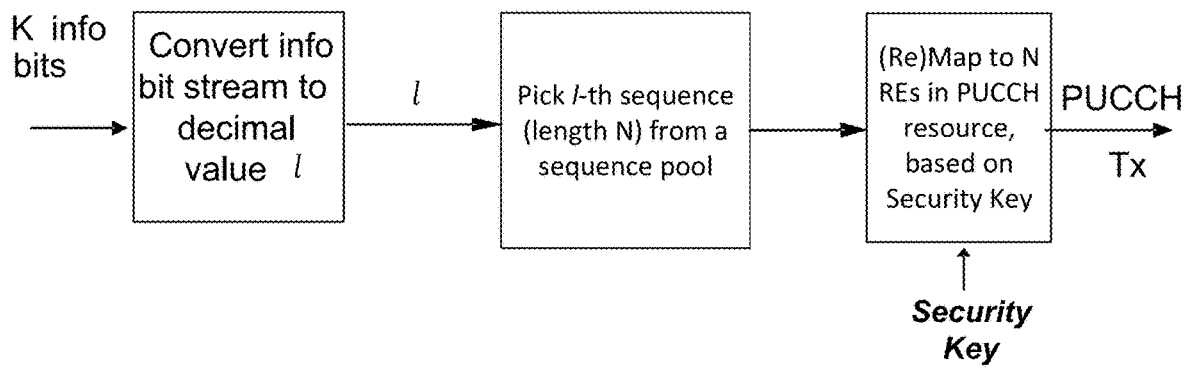

As illustrated in FIG. 9B, in some cases, the UE may remap the N REs based on the secret key (a certain mapping function parameterized by the secret key value). In some cases, multiple of the mechanisms described above may be combined to secure a DMRS-less PUCCH transmission (and the particular option/options may be indicated by the gNB).

In some cases, a UE may use frequency hopping to alter the frequency resources used for PUCCH transmissions. For example, in some cases a frequency hopping pattern may be at least based on a configurable ID (e.g., with a bitwidth of [10] bits) and the UE may select frequency resources, for any particular PUCCH transmission, according to the pattern.

In some cases, the UE may use the secure key to secure such frequency hopping. For example, according to certain aspects, the configurable ID on which a frequency hopping pattern is based may be replaced with the secret key (e.g., partially or fully based on the available key size). In some cases, the configurable ID may be XORed with the key (again, partially or fully based on the available key). In such cases, the gNB may share the ID after generating the key and send a third key, for example, in a way that the final XOR output of the secret key and this third key will be the configurable ID.

Figure 10:
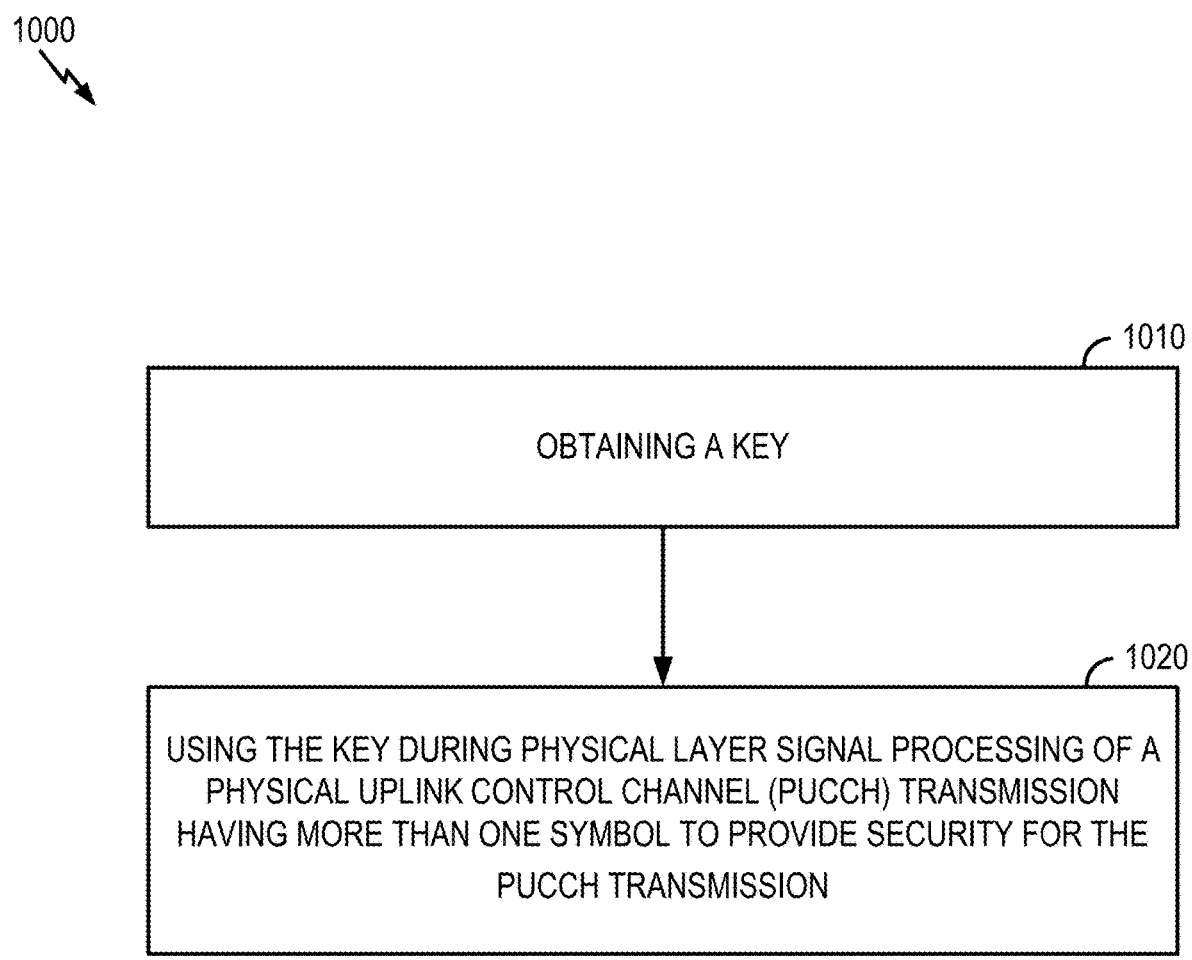
FIG. 10 is a flow diagram illustrating example operations for wireless communication by a user equipment (UE), according to aspects of the present disclosure.

FIG. 10 is a flow diagram illustrating example operations 1000 for wireless communication by a UE, in accordance with certain aspects of the present disclosure. The operations 1000 may be performed, for example, by a UE (e.g., such as the UE 104 illustrated in FIGS. 1 and 2). The operations 1000 may be implemented as software components that are executed and run on one or more processors (e.g., controller/processor 280 of FIG. 2). Further, the transmission and reception of signals by the BS in operations 1000 may be enabled, for example, by one or more antennas (e.g., antennas 252 of FIG. 2). In certain aspects, the transmission and/or reception of signals by the BS may be implemented via a bus interface of one or more processors (e.g., controller/processor 280) obtaining and/or outputting signals.

The operations 1000 may begin at a first block 1010 by obtaining a key. At 1020, the UE uses the key during physical layer signal processing of a physical uplink control channel (PUCCH) transmission having more than one symbol to provide security for the PUCCH transmission.

Figure 11:
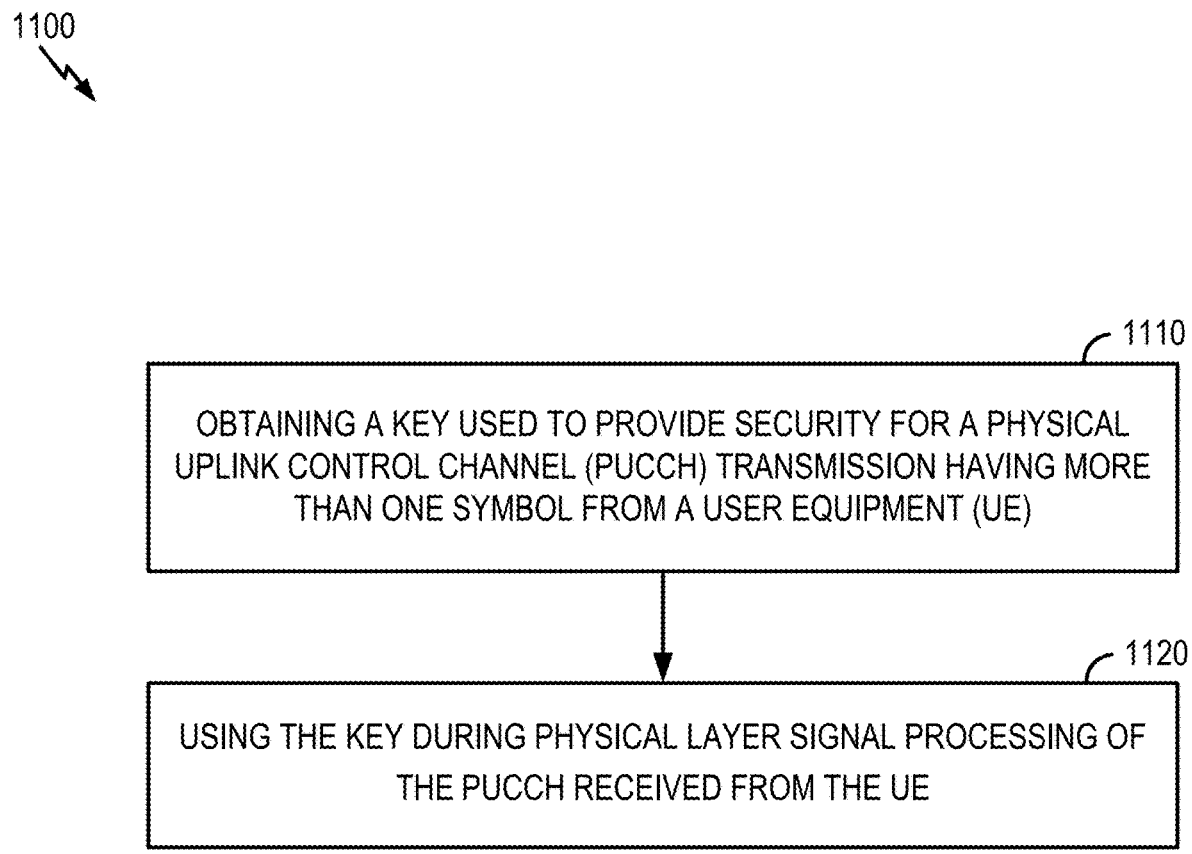
FIG. 11 is a flow diagram illustrating example operations for wireless communication by a network entity, according to aspects of the present disclosure.

FIG. 11 is a flow diagram illustrating example operations 1100 for wireless communication by a network entity, in accordance with certain aspects of the present disclosure. The operations 1100 may be performed, for example, by a BS (e.g., such as the BS 102 illustrated in FIGS. 1 and 2). The operations 1100 may be complementary to the operations 1000 illustrated in FIG. 10 performed by the UE. The operations 1100 may be implemented as software components that are executed and run on one or more processors (e.g., controller/processor 240 of FIG. 2). Further, the transmission and reception of signals by the UE in operations 1000 may be enabled, for example, by one or more antennas (e.g., antennas 234 of FIG. 2). In certain aspects, the transmission and/or reception of signals by the UE may be implemented via a bus interface of one or more processors (e.g., controller/processor 240) obtaining and/or outputting signals.

The operations 1100 may begin, at a first block 1110, by obtaining a key used to provide security for a physical uplink control channel (PUCCH) transmission having more than one symbol from a user equipment (UE). At 1120, the network entity uses the key during physical layer signal processing of the PUCCH received from the UE.

Example Wireless Communication Devices

Figure 12:
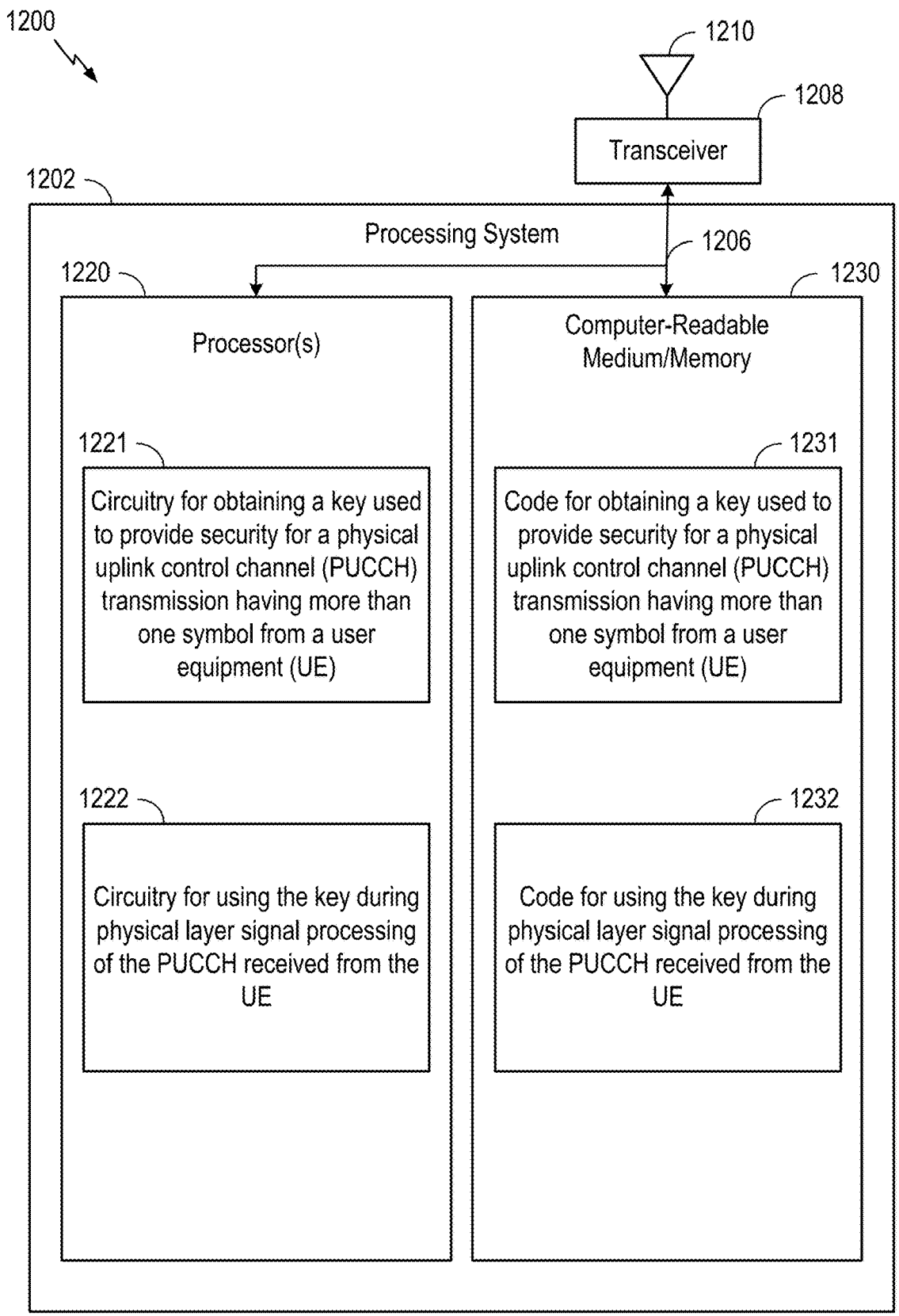
FIG. 12 is a block diagram illustrating aspects of an example communications device, according to aspects of the present disclosure.

FIG. 12 is a block diagram illustrating an example communications device 1200 that includes various components operable, configured, or adapted to perform operations for the techniques disclosed herein, such as the operations depicted and described with respect to FIG. 10. In some examples, communication device 1200 may be a UE 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 10, or other operations for performing the various techniques discussed herein for securing PHY layer communications.

In the illustrated example, computer-readable medium/memory 1230 stores code 1231 for obtaining a key and code 1232 for using the key during physical layer signal processing of a physical uplink control channel (PUCCH) transmission having more than one symbol to provide security for the PUCCH transmission.

In the depicted example, the one or more processors 1220 include circuitry configured to implement the code stored in the computer-readable medium/memory 1230, including circuitry 1221 for obtaining a key and circuitry 1222 for using the key during physical layer signal processing of a physical uplink control channel (PUCCH) transmission having more than one symbol to provide security for the PUCCH transmission.

Various components of communications device 1200 may provide means for performing the methods described herein, including with respect to FIG. 12.

In some examples, means for transmitting or sending (or means for outputting for transmission) may include the transceivers 254 and/or antenna(s) 252 of the UE 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the UE illustrated in FIG. 2 and/or transceiver 1208 and antenna 1210 of the communication device 1200 in FIG. 12.

Notably, FIG. 12 is an example, and many other examples and configurations of communication device 1200 are possible.

Figure 13:
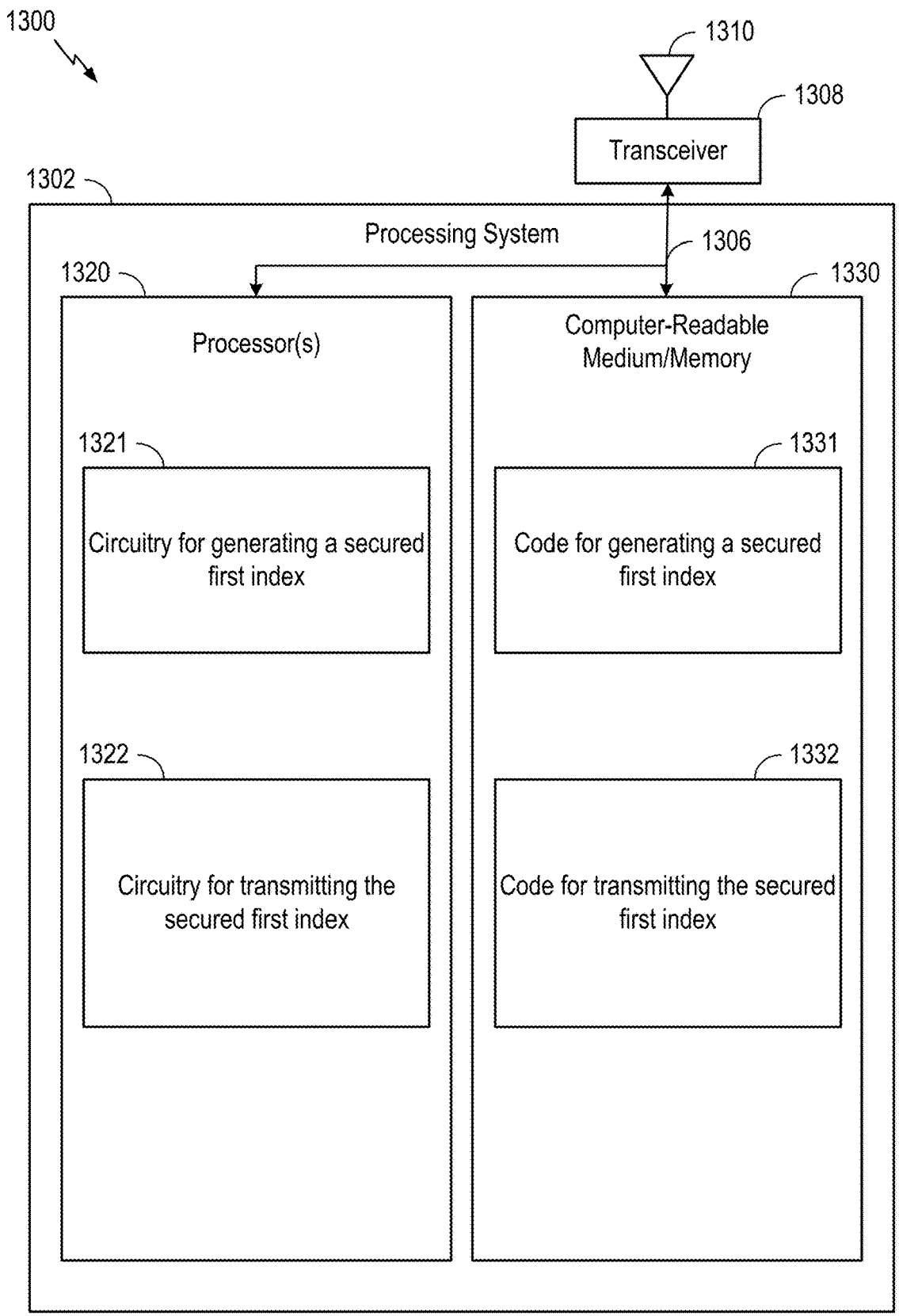
FIG. 13 is a block diagram illustrating aspects of an example communications device, according to aspects of the present disclosure.

FIG. 13 is a block diagram illustrating an communications device 1300 that includes various components operable, configured, or adapted to perform operations for the techniques disclosed herein, such as the operations depicted and described with respect to FIG. 11. In some examples, communication device 1300 may be a base station 102 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 11, or other operations for performing the various techniques discussed herein for securing PHY layer communications.

In the depicted example, computer-readable medium/memory 1330 stores code 1331 for obtaining a key used to provide security for a physical uplink control channel (PUCCH) transmission having more than one symbol from a user equipment (UE) and code 1332 for using the key during physical layer signal processing of the PUCCH received from the UE.

In the depicted example, the one or more processors 1320 include circuitry configured to implement the code stored in the computer-readable medium/memory 1330, including circuitry 1321 for obtaining a key used to provide security for a physical uplink control channel (PUCCH) transmission having more than one symbol from a user equipment (UE) and circuitry 1322 for using the key during physical layer signal processing of the PUCCH received from the UE.

Various components of communications device 1300 may provide means for performing the methods described herein, including with respect to FIG. 11.

In some examples, means for transmitting or sending (or means for outputting for transmission) may include the transceivers 232 and/or antenna(s) 234 of the base station 102 illustrated in FIG. 2 and/or transceiver 1308 and antenna 1310 of the communication device 1300 in FIG. 13.

In some examples, means for receiving (or means for obtaining) may include the transceivers 232 and/or antenna(s) 234 of the user equipment 104 illustrated in FIG. 2 and/or transceiver 1308 and antenna 1310 of the communication device 1300 in FIG. 13.

Notably, FIG. 13 is an example, and many other examples and configurations of communication device 1300 are possible.

EXAMPLE CLAUSES

Implementation examples are described in the following numbered clauses:

Clause 1: A method for wireless communications by a user equipment (UE), comprising: obtaining a key; and using the key during physical layer signal processing of a physical uplink control channel (PUCCH) transmission having more than one symbol to provide security for the PUCCH transmission.

Clause 2: The method of Clause 1, wherein the physical layer signal processing comprises: modulating coded information bits to generate a modulated signal; generating a waveform after modulating the coded information bits; and multiplexing a demodulation reference signal (DMRS) sequence in the waveform.

Clause 3: The method of Clause 2, wherein using the key during physical layer signal processing comprises performing a logical function with the key and at least one of: the information bits before the modulating; the DMRS sequence; or a cell-specific sequence used for the PUCCH transmission.

Clause 4: The method of Clause 3, further comprising determining a DMRS configuration based on the key.

Clause 5: The method of Clause 3, further comprising swapping real and imaginary parts of the modulated signal.

Clause 6: The method of Clause 2, further comprising: determining a phase shift based on the key; and applying the phase shift to the modulated signal.

Clause 7: The method of any one of Clauses 1-6, wherein the physical layer signal processing comprises: converting information bits to a value l; selecting a sequence of length N from a sequence pool based on the value l; and mapping the sequence to N resource elements.

Clause 8: The method of Clause 7, wherein using the key during physical layer signal processing comprises performing a logical function with the key and at least a part of the value l.

Clause 9: The method of Clause 8, wherein: the value l comprises at least first and second parts; and different keys are used to perform the logical function with the first and second parts.

Clause 10: The method of Clause 7, wherein providing security for the PUCCH transmission comprises determining the mapping of the sequence to N resource elements based on the key.

Clause 11: The method of Any one of Clauses 1-10, wherein: frequency resources for the PUCCH transmission are determined according to a frequency hopping pattern based at least in part on the key.

Clause 12: The method of Clause 11, wherein part or all of the key is used to determine the frequency hopping pattern.

Clause 13: The method of Clause 11, wherein a logical function is performed with a configurable identifier and part or all of the key to determine the frequency hopping pattern.

Clause 14: The method of Clause 13, further comprising receiving signaling indicating at least one of the key, the configurable identifier, or another key used to generate the configurable identifier.

Clause 15: The method of Any one of Clauses 1-14, further comprising receiving signaling indicating how the UE is to use the key to provide security for the PUCCH transmission.

Clause 16: A method for wireless communications by a network entity, comprising: obtaining a key used to provide security for a physical uplink control channel (PUCCH) transmission having more than one symbol from a user equipment (UE); and using the key during physical layer signal processing of the PUCCH received from the UE.

Clause 17: The method of Clause 16, wherein the physical layer signal processing comprises: processing a demodulation reference signal (DMRS) sequence multiplexed with coded information bits in a received waveform; and decoding the coded information bits.

Clause 18: The method of Clause 17, wherein using the key during physical layer signal processing comprises performing a logical function with the key and at least one of: the information bits after modulating; the DMRS sequence; or a cell-specific sequence used for the PUCCH transmission.

Clause 19: The method of Clause 18, further comprising determining a DMRS configuration based on the key.

Clause 20: The method of Clause 18, further comprising swapping real and imaginary parts of the modulated signal.

Clause 21: The method of Clause 17, further comprising: determining a phase shift based on the key; and applying the phase shift before demodulating the modulated signal.

Clause 22: The method of Any one of Clauses 16-21, wherein the physical layer signal is received on N resource elements and processing comprises: demapping a sequence from the N resource elements; determining a value l associated with the sequence; and obtaining a set of information bits based on the value l.

Clause 23: The method of Clause 22, wherein using the key during physical layer signal processing comprises performing a logical function with the key to obtain at least a part of the value l.

Clause 24: The method of Clause 23, wherein: the value l comprises at least first and second parts; and different keys are used to perform the logical function with the first and second parts.

Clause 25: The method of Clause 22, wherein the processing comprises determining a mapping of the sequence to N resource elements based on the key.

Clause 26: The method of Any one of Clauses 16-25, wherein: frequency resources for the PUCCH transmission are determined according to a frequency hopping pattern based at least in part on the key.

Clause 27: The method of Clause 26, wherein part or all of the key is used to determine the frequency hopping pattern.

Clause 28: The method of Clause 26, wherein a logical function is performed with a configurable identifier and part or all of the key to determine the frequency hopping pattern.

Clause 29: The method of Clause 28, further comprising transmitting signaling, to the UE, indicating at least one of the key, the configurable identifier, or another key used to generate the configurable identifier.

Clause 30: The method of Any one of Clauses 16-29, further comprising transmitting signaling, to the UE, indicating how the UE is to use the key to provide security for the PUCCH transmission.

Clause 31: An apparatus, comprising: a memory comprising executable instructions; one or more processors configured to execute the executable instructions and cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by one or more processors of an apparatus, cause the apparatus to perform a method in accordance with any one of Clauses 1-30.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgment (ACK) or negative acknowledgment (NACK) feedback. The PUSCH carries data, and may additionally be used to carry a buffer status report (BSR), a power headroom report (PHR), and/or UCI.

Additional Considerations

The preceding description provides examples for securing PHY layers in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, and others. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    obtaining a key; and
    using the key during physical layer signal processing of a physical uplink control channel (PUCCH) transmission having more than one symbol to provide security for the PUCCH transmission, wherein
    the physical layer signal processing comprises:
    converting information bits to a value I;
    selecting a sequence of length N from a sequence pool based on the value I; and
    mapping the sequence to N resource elements.

2. The method of claim 1, wherein the physical layer signal processing comprises:
    modulating coded information bits to generate a modulated signal;
    generating a waveform after modulating the coded information bits; and
    multiplexing a demodulation reference signal (DMRS) sequence in the waveform.

3. The method of claim 2, wherein using the key during physical layer signal processing comprises performing a logical function with the key and at least one of:
    the coded information bits before the modulating;
    the DMRS sequence; or
    a cell-specific sequence used for the PUCCH transmission.

4. The method of claim 3, further comprising determining a DMRS configuration based on the key.

5. The method of claim 3, further comprising swapping real and imaginary parts of the modulated signal.

6. The method of claim 2, further comprising:
    determining a phase shift based on the key; and
    applying the phase shift to the modulated signal.

7. The method of claim 1, wherein using the key during physical layer signal processing comprises performing a logical function with the key and at least a part of the value I.

8. The method of claim 7, wherein:
    the value l comprises at least first and second parts; and
    different keys are used to perform the logical function with the first and second parts.

9. The method of claim 1, wherein providing security for the PUCCH transmission comprises determining the mapping of the sequence to N resource elements based on the key.

10. The method of claim 1, wherein:
    frequency resources for the PUCCH transmission are determined according to a frequency hopping pattern based at least in part on the key.

11. The method of claim 10, wherein part or all of the key is used to determine the frequency hopping pattern.

12. The method of claim 10, wherein a logical function is performed with a configurable identifier and part or all of the key to determine the frequency hopping pattern.

13. The method of claim 12, further comprising receiving signaling indicating at least one of the key, the configurable identifier, or another key used to generate the configurable identifier.

14. The method of claim 1, further comprising receiving signaling indicating how the UE is to use the key to provide security for the PUCCH transmission.

15. A method for wireless communications by a network entity, comprising:
    obtaining a key used to provide security for a physical uplink control channel (PUCCH) transmission having more than one symbol from a user equipment (UE); and
    using the key during physical layer signal processing of the PUCCH received from the UE, wherein
    the physical layer signal is received on N resource elements and processing comprises:
    demapping a sequence from the N resource elements;
    determining a value I associated with the sequence; and
    obtaining a set of information bits based on the value I.

16. The method of claim 15, wherein the physical layer signal processing comprises:
    processing a demodulation reference signal (DMRS) sequence multiplexed with coded information bits in a received waveform; and
    decoding the coded information bits.

17. The method of claim 16, wherein using the key during physical layer signal processing comprises performing a logical function with the key and at least one of:
    the coded information bits;
    the DMRS sequence; or
    a cell-specific sequence used for the PUCCH transmission.

18. The method of claim 17, further comprising determining a DMRS configuration based on the key.

19. The method of claim 17, further comprising swapping real and imaginary parts of a received waveform before demodulation.

20. The method of claim 16, further comprising:
    determining a phase shift based on the key; and
    applying the phase shift before demodulating the received waveform.

21. The method of claim 15, wherein using the key during physical layer signal processing comprises performing a logical function with the key to obtain at least a part of the value l.

22. The method of claim 21, wherein:
the value l comprises at least first and second parts; and
different keys are used to perform the logical function with the first and second parts.

23. The method of claim 15, wherein the processing comprises determining a mapping of the sequence to N resource elements based on the key.

24. The method of claim 15, wherein:
frequency resources for the PUCCH transmission are determined according to a frequency hopping pattern based at least in part on the key.

25. The method of claim 24, wherein part or all of the key is used to determine the frequency hopping pattern.

26. The method of claim 24, wherein a logical function is performed with a configurable identifier and part or all of the key to determine the frequency hopping pattern.

27. The method of claim 26, further comprising transmitting signaling, to the UE, indicating at least one of the key, the configurable identifier, or another key used to generate the configurable identifier.

28. The method of claim 15, further comprising transmitting signaling, to the UE, indicating how the UE is to use the key to provide security for the PUCCH transmission.

* * * * *